(12) United States Patent
Miyazaki et al.

(10) Patent No.: US 7,569,260 B2
(45) Date of Patent: Aug. 4, 2009

(54) PHOTOSENSITIVE COMPOSITION AND CURED PRODUCTS THEREOF

(75) Inventors: Kuon Miyazaki, Kanagawa (JP); Hideaki Takahashi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 266 days.

(21) Appl. No.: 10/567,355

(22) PCT Filed: Aug. 18, 2004

(86) PCT No.: PCT/JP2004/011848

§ 371 (c)(1), (2), (4) Date: Feb. 6, 2006

(87) PCT Pub. No.: WO2005/019299

PCT Pub. Date: Mar. 3, 2005

(65) Prior Publication Data

US 2006/0222999 A1    Oct. 5, 2006

(30) Foreign Application Priority Data

| Aug. 21, 2003 | (JP) | ............................. 2003-297165 |
| Mar. 30, 2004 | (JP) | ............................. 2004-099100 |

(51) Int. Cl.
 C09K 10/00    (2006.01)
 C08L 63/00    (2006.01)
(52) U.S. Cl. .................. 428/1.53; 430/20; 522/168; 522/170
(58) Field of Classification Search ............... 522/170, 522/168; 438/780; 430/20; 428/1.53
 See application file for complete search history.

(56) References Cited

U.S. PATENT DOCUMENTS

| 3,794,576 A | | 2/1974 | Watt |
| 4,256,828 A | | 3/1981 | Smith |
| 4,318,766 A | | 3/1982 | Smith |
| 5,079,129 A | | 1/1992 | Roth et al. |
| 5,300,380 A | | 4/1994 | Roth et al. |
| 5,437,964 A | | 8/1995 | Lapin et al. |
| 5,478,871 A | * | 12/1995 | Takebe et al. ............... 523/443 |
| 5,510,226 A | | 4/1996 | Lapin et al. |
| 5,887,522 A | * | 3/1999 | Bocko et al. ................. 101/211 |
| 6,136,497 A | | 10/2000 | Melisaris et al. |
| 6,361,866 B1 | * | 3/2002 | Ogima et al. ............... 428/413 |
| 6,413,697 B1 | | 7/2002 | Melisaris et al. |
| 6,548,566 B1 | | 4/2003 | Huebener et al. |
| 6,599,954 B1 | * | 7/2003 | Hayashi et al. ............... 522/25 |
| 6,790,582 B1 | * | 9/2004 | Eilbeck ....................... 430/190 |
| 7,087,702 B2 | * | 8/2006 | Ogura et al. ................. 528/106 |
| 2001/0033990 A1 | * | 10/2001 | Hatakeyama et al. .... 430/270.1 |
| 2002/0134449 A1 | | 9/2002 | Nishi et al. |
| 2002/0177073 A1 | | 11/2002 | Melisaris et al. |
| 2004/0010050 A1 | | 1/2004 | Huebener et al. |
| 2004/0192070 A1 | * | 9/2004 | Tateishi ....................... 438/780 |
| 2004/0197704 A1 | * | 10/2004 | Eilbeck .................. 430/270.1 |
| 2006/0202220 A1 | * | 9/2006 | Hayashi ....................... 257/98 |

FOREIGN PATENT DOCUMENTS

| EP | 0831127 | 3/1998 |
| EP | 1036811 | 9/2000 |
| GB | 2055843 | 7/1980 |
| JP | 59-42688 | 10/1984 |
| JP | 4-120182 | 4/1992 |
| JP | 5-136575 | 6/1993 |
| JP | 6-100665 | 4/1994 |
| JP | 6-298911 | 10/1994 |
| JP | 2667934 | 6/1997 |
| JP | 9-183928 | 7/1997 |
| JP | 9-328634 | 12/1997 |
| JP | 10-102026 | 4/1998 |
| JP | 11-184086 | 7/1999 |
| JP | 2000-136230 | 5/2000 |
| JP | 3251188 | 11/2001 |
| JP | 2001-335621 | 12/2001 |
| JP | 2001-527143 | 12/2001 |
| JP | 2002-69159 | 3/2002 |
| JP | 2002-69269 | 3/2002 |
| JP | 2002-509982 | 4/2002 |
| WO | 96/35756 | 11/1996 |
| WO | 01/02697 | 3/2001 |
| WO | 03/100524 | 12/2003 |

OTHER PUBLICATIONS

English Language Abstract of JP 6-298911.
English Language Abstract of JP 9-328634.

(Continued)

Primary Examiner—Susan W Berman
(74) Attorney, Agent, or Firm—Greenblum & Bernstein, P.L.C.

(57) ABSTRACT

There is provided a photosensitive composition excellent in photo-curability which comprises an epoxy compound having two or more epoxy groups, a polynuclear phenol compound having a specific structure and an energy beam-sensitive cationic polymerization initiator, and optionally a predetermined percentage of a hydroxyl group-containing compound having one or more hydroxyl groups and one or more of at least one of a vinyl ether group and an oxetanyl group in a molecule, and a cured product of the same whose film is excellent in adhesion to various substrates, water resistance and flexibility.

19 Claims, 1 Drawing Sheet

OTHER PUBLICATIONS

English Language Abstract of JP 4-120182.
English Language Abstract of JP59-42688.
English Language Abstract of JP9-183928.
English Language Abstract of JP 3251188.
English Language Abstract of JP 2002-69269.
English Language Abstract of JP 2002-69159.
English Language Abstract of JP6-100665.
English Language Abstract of JP 2001-335621.
English Language Abstract of JP 5-136575.
English Language Abstract of JP 2001-136230.
English Language Abstract of JP 11-184086.
English Language Abstract of JP 10-102026.
Tsunooka et al., "Industrial Development of Cationic Curing Technology," Material Stage, published by Technical Information Association, vol. 2, No. 2, pp. 39-46 (May 10, 2002). Accompanied by a partial english translation.

* cited by examiner

PHOTOSENSITIVE COMPOSITION AND CURED PRODUCTS THEREOF

TECHNICAL FIELD

The present invention relates to a photosensitive composition which forms cured films in the air by the irradiation of energy beams, the formed films being useful as coatings, adhesives, inks and film coatings, more specifically, UV inks for ink jet, sealers for display panels such as liquid crystals and organic EL, adhesives for bonding optical disks, materials for forming a surface protective layer of a Blue-ray disk which is a next-generation optical disk, coating materials for forming antireflective films and hard coating materials, and to cured products thereof.

BACKGROUND ART

A curing system employing energy beams such as ultraviolet rays has become an important method for improving productivity and solving recent environmental problems. The mainstream of current photo-curing systems is a free radical curing system employing (meth)acrylate materials. However, materials of a cationic curing system employing a material such as epoxy, vinyl ether and oxetane have an advantage over a free radical curing system in that (a) they are excellent in surface and thin film curability since they are hardly susceptible to cure inhibition by oxygen; (b) they have small curing shrinkage and have good adhesion to a wide range of substrates; and (c) the amount of residual monomers can be suppressed to a low level because active species have a long life and the curing gradually proceeds even after the completion of light irradiation (dark reaction). Therefore, in recent years, the materials of a cationic curing system are investigated for applications in coatings, adhesives, sealers for displays, printing inks, three-dimensional shaping, silicone-based release paper, photoresists, sealers for electronic components and the like (refer, for example, to Non-patent Document 1).

The compounds mainly used in the photo-cationic curing system include epoxy compounds, and among others, alicyclic epoxy compounds rich in reactivity are heavily used (refer to Patent Document 1). These alicyclic epoxy compounds have better surface curability than compounds of a free-radical system in that they are not susceptible to cure inhibition by oxygen even in the air. However, they have a problem that the rate of reaction is reduced as polymerization proceeds, resulting in insufficient internal curability and leading to insufficient physical properties of the cured products. Moreover, there are only a small number of types in the compounds that can be used, and it is difficult to control physical properties of the cured products to be obtained. On the other hand, there are abundant types of glycidyl type epoxy compounds widely used in heat curing as compared with the above-described alicyclic epoxy compounds. However, the glycidyl type epoxy compounds are insufficient in reactivity when they are subjected to photo-cationic curing. Therefore, some technique must be used such as use of special initiators such as $SbF_6$ and $AsF_6$ which have problems in safety or use of heat curing in combination. In relation to the above, oxetane compounds are known to enhance the rate of polymerization when they are used in combination with epoxy compounds since the oxetane compounds are slow in initiation reaction but high in the rate of propagation reaction when they are used alone in photo-cationic polymerization. However, also in this case, photo-curability is not sufficient yet as compared with the conventional free-radical system, and it is necessary to further increase sensitivity. Other than the above, it is known that vinyl ether compounds have high cationic polymerizability, but there is a problem that cured films obtained by homopolymerization of the same have larger shrinkage on curing than those of the above-described epoxy or oxetane, leading to reduction of adhesion with a substrate.

Thus, a number of attempts have been made to increase polymerizability of epoxy compounds and maintain adhesion by using vinyl ether compounds in combination with the above-described alicyclic epoxy compounds (refer, for example, to Patent Documents 2 and 3). Moreover, attempts have been made to use the compositions obtained from this combination in specific applications, for example, as compositions for stereolithography (Patent Document 4), overcoat agents for optical disks (Patent Document 5) and ultraviolet ray curable compositions for ink jet recording (Patent Document 6). However, in the compositions in which vinyl ether compounds are simply combined with epoxy compounds in the manner as described above, the reactivity of the epoxy compounds is indeed a little improved, but the reactivity of the vinyl ether compounds is greatly reduced, resulting in the fact that sufficient physical properties of cured films cannot be obtained. In the above-described attempts (Patent Documents 4 and 5) for the purpose of improving the above problem, polyfunctional vinyl ether compounds have been employed, but the effect of these compounds is not yet sufficient.

On the other hand, attempts have been made to enhance the curability by using hydroxyl group-containing compounds such as aliphatic polyhydric alcohols (Patent Documents 7 and 8) or phenol compounds (Patent Documents 9 and 10) as optional components in the cationic composition composed of epoxy compounds. However, in the case of the aliphatic polyhydric alcohols, there is a problem that although reactivity of the epoxy compounds is improved, the cured films are weakened. In the case of the phenol compounds, there are disclosed phenol compounds having one or two phenolic aromatic rings such as dihydroxybenzene and trihydroxybenzene and resole type phenol compounds having a methylol group in a molecule. However, all of them have insufficient curability, and in particular when resole type phenol compounds are used, there is a problem that hardness of the cured films is gradually reduced.

In addition, a technology to add phenol compounds is disclosed also in Patent Document 11. In this case, it is possible to store the cationic composition containing an unstable initiator for a long period of time because the phenol compounds act as a radical inhibitor or an antioxidant. However, it is impossible to expect the improvement of the photo-curability itself of the composition.

[Patent Document 1] U.S. Pat. No. 3,794,576
[Patent Document 2] Japanese Patent Laid-Open No. 06-298911
[Patent Document 3] Japanese Patent Laid-Open No. 09-328634
[Patent Document 4] Japanese Patent No. 2667934
[Patent Document 5] Japanese Patent Laid-Open No. 04-120182
[Patent Document 6] Japanese Patent Laid-Open No. 09-183928
[Patent Document 7] Japanese Patent No. 1266325
[Patent Document 8] National Publication of International Patent Application No. 2001-527143
[Patent Document 9] National Publication of International Patent Application No. 2002-509982
[Patent Document 10] Japanese Patent No. 3251188

[Patent Document 11] Japanese Patent Laid-Open No. 2002-69269

[Non-Patent Document 1] Masahiro Tsunooka, et al., "Industrial Development of Cationic Curing Technology", MATERIAL STAGE, published by Technical Information Association, Vol. 2, No. 2, p. 39-92, May 10, 2002

DISCLOSURE OF THE INVENTION

The present invention provides a cationic photosensitive composition having excellent photo-curability (surface curability and internal curability) which is not inhibited by oxygen in the air, photo-cured products of the composition exhibiting good adhesion to various substrates such as resin, metal and glass; photosensitive coating materials, ink jet inks, adhesives, in particular sealers for flat panel displays (FPD) such as organic EL, all composed of the above composition; and photo-cured products thereof.

As a result of extensive study to solve the above-described problems, the inventors have found that the above problems can be solved by a photosensitive composition comprising a specific epoxy compound, a specific polynuclear phenol compound and a photo-cationic polymerization initiator, and by a photosensitive composition further comprising a vinyl ether compound or an oxetane compound having a hydroxyl group, and have accomplished the present invention.

The present invention provides a photosensitive composition characterized by comprising from 30 to 90 percent by weight of an epoxy compound (a) having two or more epoxy groups in a molecule; from 0.1 to 40 percent by weight of a polynuclear phenol compound (b) comprising three to five phenolic aromatic rings, wherein either of the ortho positions of each hydroxyl group is not substituted with any of a methylol group, or an alkyl group or cycloalkyl group having four or more carbon atoms and each of two or more of the phenolic aromatic rings has at least one unsubstituted position ortho to the hydroxyl group; and from 0.1 to 10 percent by weight of an energy beam-sensitive cationic polymerization initiator (c), and also provides a photosensitive composition characterized by further comprising from 1 to 60 percent by weight of a hydroxyl-group containing compound (d) having one or more hydroxyl groups and one or more of at least one of a vinyl ether group and an oxetanyl group in a molecule.

DESCRIPTION OF SYMBOLS 1 substrate
2 hole injection electrode
3 hole transport layer
4 light-emitting layer
5 electron injection electrode
6 sealing member
7 adhesive (layer)

BEST MODE FOR CARRYING OUT THE INVENTION

The present invention will be specifically described below.

In the present invention, it is important to employ an epoxy compound (a) having two or more epoxy groups in a molecule for achieving excellent light-curability. Such a compound is not particularly limited as long as it satisfies the above-described requirements, and may include, for example, glycidyl ether type epoxy compounds, alicyclic epoxy compounds and the like.

Specific examples of the glycidyl ether type epoxy compounds may include bisphenol A type epoxy compounds, bisphenol F type epoxy compounds, phenol novolac type epoxy compounds, cresol novolac type epoxy compounds, hydrogenated bisphenol A type epoxy compounds, diglycidyl ethers of alkylene oxide adducts of bisphenol A, diglycidyl ethers of alkylene oxide adducts of bisphenol F, diglycidyl ethers of alkylene oxide adducts of hydrogenated bisphenol A, ethylene glycol diglycidyl ether, propylene glycol diglycidyl ether, neopentyl glycol diglycidyl ether, butanediol diglycidyl ether, hexanediol diglycidyl ether, cyclohexanedimethanol diglycidyl ether, polyethylene glycol diglycidyl ether, polypropylene glycol diglycidyl ether, trimethylolpropane di- and/or triglycidyl ether, pentaerythritol tri- and/or tetraglycidyl ether, sorbitol hepta- and/or hexaglycidyl ether, resorcin diglycidyl ether, dicyclopentadienephenol adduct type glycidyl ether, methylenebis(2,7-dihydroxynaphthalene)tetraglycidyl ether, 1,6-dihydroxynaphthalene diglycidyl ether and the like.

Specific examples of the alicyclic epoxy compounds includes 3,4-epoxycyclohexylmethyl-3,4-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexyl-3,4-epoxy-6-methylcyclohexanecarboxylate, methylenebis(3,4-epoxycyclohexane), dicyclopentadiene diepoxide, ethyleneglycol-di(3,4-epoxycyclohexylmethyl)ether, ethylenebis(3,4-epoxycyclohexanecarboxylate), propylenebis(3,4-epoxycyclohexanecarboxylate), dioctyl epoxyhexahydrophthalate, di-2-ethylhexyl epoxyhexahydrophthalate, 1,4-cyclohexanedimethanol-di(3,4-epoxycyclohexanecarboxylate) and the like.

Difunctional alicyclic epoxy compounds which can be used include CELLOXIDE 2021, 2080, 3000 (manufactured by Daicel Chemical Industries, Ltd.), UVR-6110, 6105, 6128, ERLX-4360 (manufactured by Dow Chemical Japan Ltd.), and polyfunctional alicyclic epoxy compounds of tri- or more functionality which can be used include EPOLEAD GT 300, GT 400 (manufactured by Daicel Chemical Industries, Ltd.) and the like.

Among them, alicyclic epoxy compounds are preferred since they are excellent in cationic polymerizability. These compounds having epoxy groups can be used alone or in combination of two or more thereof.

The polynuclear phenol compounds (b) of the present invention are composed of a plurality of phenolic aromatic rings. As used herein the phenolic aromatic ring means an aromatic ring having a phenolic hydroxyl group. In the present invention, the phenolic hydroxyl group plays an important role in photo-crosslinking reaction, and the photosensitive compositions exhibiting excellent photo-curability of the present invention can be obtained only by using such polynuclear phenol compounds having phenolic hydroxyl groups.

Moreover, the polynuclear phenol compound (b) has no methylol group at either of the ortho positions of each hydroxyl group thereof. That is, the polynuclear phenol compounds (b) generally do not include so called resole resins having methylol groups in a molecule. Although methylol groups have reactivity with epoxy groups, they are not pre- ferred as there is a problem that the linkages formed as a result of the reaction are unstable under acidic conditions, causing reduction with time of the hardness of a film obtained by curing. Further, the polynuclear phenol compound (b) is characterized in that it has no alkyl or cycloalkyl group having four or more carbon atoms at ortho positions, and in particular does not include phenol compounds generally called free-radical inhibitors or antioxidants such as hindered phenols such as those having a bulky t-butyl group or the like. This is because the polynuclear phenol compound (b), in which ortho positions of the phenolic hydroxyl group thereof are substituted with a bulky substituent that inhibits photo-curing reaction, is not preferred since the phenolic hydroxyl group is directly involved in the reaction.

In addition, it is an essential requirement that the polynuclear phenol compound (b) has three to five phenolic aromatic rings and, in the molecule, each of two or more of the phenolic aromatic rings has at least one unsubstituted position ortho to the hydroxyl group. If the polynuclear phenol compound (b) has only one to two phenolic aromatic rings, it cannot effectively form a crosslinking structure in the photo-curing reaction, and if it has six or more phenolic aromatic rings, there will be generated those phenolic hydroxyl groups which are not involved in the crosslinking reaction, adversely affecting curability and physical properties of cured films.

These polynuclear phenol compounds may include, for example, various polynuclear phenol compounds represented by the following general formulas (5) to (13):

[Formula 1]

(5)

[Formula 2]

(6)

-continued

[Formula 3]

(7)

(wherein $R_1$ denotes a $C_1$-$C_5$ alkyl group or alkoxy group, wherein $R_1$ in different benzene rings each may be the same or different and p pieces of $R_1$ in each benzene ring may be the same or different; p is an integer from 0 to 4, wherein p in different benzene rings each may be the same or different; q is an integer from 1 to 3, wherein q in different benzene rings each may be the same or different; $p+q \leq 5$; and wherein in the case $R_1$ denotes $C_4$ or $C_5$, $R_1$ is not positioned at the ortho positions to the hydroxyl group on a benzene ring),

[Formula 4]

(8)

(wherein $R_2$ is the same as in formula (5) except it has $C_1$-$C_3$; and p and q are the same as in formula (5)),

[Formula 5]

(9)

(wherein B is a group selected from the groups represented by the following formulas (10), (11) and (12); and $R_1$ and p are the same as in formula (5)),

[Formula 6]

(10)

[Formula 7]

(11)

[Formula 8]

and
(12)

[Formula 9]

(13)

(wherein $R_3$, p and q are the same as in formula (5));

various polynuclear phenol compounds represented by the following formulas (1) and (3):

[Formula 10]

(1)

(wherein R denotes a $C_1$-$C_5$ alkyl group, a $C_5$-$C_{10}$ cycloalkyl group, a $C_1$-$C_5$ alkoxy group, a halogen atom, a hydroxyl group, an aryl group or an aralkyl group; all of the plurality of R in the formula each may be the same or different; m is an integer from 0 to 3; and n is an integer from 1 to 3), and

[Formula 11]

(3)

(wherein n is an integer from 1 to 3); and polynuclear phenol compounds having three to five phenolic aromatic rings which are the Friedel-Crafts adducts of a low molecular weight open-chain polybutadiene and phenol.

Among them, the polynuclear phenol compounds (e) represented by general formula (1) excellent in compatibility and reactivity with epoxy compounds (a) and vinyl ethers or oxetane containing hydroxyl groups and the polynuclear phenol compounds (g) corresponding to the addition compounds represented by formula (3) which can provide cured products having low hygroscopicity and good water resistance are preferred.

In the polynuclear phenol compound (e), m is preferably 1 to 3, more preferably 1. When m is 1 to 3, the substituent R is preferably bonded at the para-position to the hydroxyl group of a benzene ring. The substituent R is preferably a $C_1$-$C_5$ alkyl group and alkoxy group, a $C_5$-$C_{10}$ cycloalkyl group, an aryl group and an aralkyl group. The $C_1$-$C_5$ alkyl groups include, for example, a methyl group, an ethyl group, a propyl group, an isopropyl group, a t-butyl group, a sec-butyl group, a t-amyl group and the like. The $C_5$-$C_{10}$ cycloalkyl groups preferably include, for example, a $C_6$ cyclohexyl group, and the $C_1$-$C_5$ alkoxy groups include, for example, a methoxy group, an ethoxy group, a propoxy group, an isopropoxy group, a butoxy group, a t-butoxy group, a sec-butoxy group and the like. The aryl groups include, for example, a phenyl group, a naphthyl group, a biphenyl group and the like, and the aralkyl groups include, for example, a benzyl group, an α-methylbenzyl group, an α,α'-dimethylbenzyl group and the like.

The polynuclear phenol compounds (e) can be obtained as a condensation product in which n is represented by an integer of 0 or more by a known synthetic method, that is, by reacting, for example, a phenol having a substituent represented by R (R-substituted phenol) or phenol with formaldehyde, paraformaldehyde, formalin or the like in the presence of an acid catalyst such as hydrochloric acid, oxalic acid, p-toluene sulfonic acid for several hours and several tens of hours at 0 to 150° C. Depending upon reaction conditions, it is generally possible to control the amount of various polynuclear phenol compounds (f), which are formed as a byproduct, represented by the following general formula (2):

(2)

[Formula 12]

(wherein R denotes a $C_1$-$C_5$ alkyl group, a $C_5$-$C_{10}$ cycloalkyl group, a $C_1$-$C_5$ alkoxy group, a halogen atom, a hydroxyl group, an aryl group or an aralkyl group; all of the plurality of R in the formula each may be the same or different; m is an integer from 0 to 3; and n is an integer of 0 or 4 or more) by determining the ratio of the amount of the R-substituted phenol or phenol to be used to the amount of formaldehyde.

For example, when the amount of the R-substituted phenol exceeds that of formaldehyde, the content of a phenol compound having 2 phenolic aromatic rings increases, and when the amount of the R-substituted phenol is excessively smaller than that of formaldehyde, the content of a polynuclear phenol compound (f) composed of 6 or more phenolic aromatic rings increases. When the content of the polynuclear phenol compounds (e) in the obtained condensation product is too small, it is possible to remove unreacted raw materials and the polynuclear phenol compounds (f) by a method such as distillation or reprecipitation.

In the present invention, the percentage of the polynuclear phenol compounds (e) relative to the total of the polynuclear phenol compounds (e) and (f) is preferably 40 percent by weight or more, more preferably 50 percent by weight or more, most preferably 60 percent by weight or more. When the content of the polynuclear phenol compounds (e) is less than 40 percent by weight, for example, when the amount of the phenol compound having 2 phenolic aromatic rings corresponding to the condensation product in which n=0 in general formula (2) is too large, the photo-curability of the photosensitive composition is reduced and sufficient photosensitivity cannot be obtained. On the other hand, when the amount of the polynuclear phenol compounds (f) corresponding to the condensation product in which n is 4 or more in general formula (2) is too large, unreacted phenolic hydroxyl groups remain after the completion of the photo-curing reaction and a film of the cured product does not exhibit sufficient water resistance or exhibits significant yellowing due to the lack of light resistance. Occurrence of these problems is not preferable.

As commercially available products, for example, new molecular weight distribution-intensive novolac resins: PAPS (product name: manufactured by Asahi Organic Chemicals Industry Co., Ltd.) can suitably be used as the polynuclear phenols (e) according to the present invention.

Specific examples of the R-substituted phenols to be used for synthesizing the polynuclear phenol compounds (e) include phenol, p-cresol, m-cresol, p-ethylphenol, m-ethylphenol, p-propylphenol, m-propylphenol, p-isopropylphenol, m-isopropylphenol, p-t-butylphenol, m-t-butylphenol, p-sec-butylphenol, m-sec-butylphenol, p-t-amylphenol, m-t-amylphenol, p-phenylphenol, m-phenylphenol, p-cumylphenol, p-(α-methylbenzyl)phenol, m-(α-methylbenzyl)phenol, p-cyclohexylphenol, p-methoxyphenol, m-methoxyphenol, p-chlorophenol, m-chlorophenol, catechol, resorcinol, hydroquinone and the like.

On the other hand, the polynuclear phenol compounds (g) can be obtained by subjecting dicyclopentadiene and phenol to Friedel-Crafts reaction in the presence of an acid catalyst such as $BF_3$. At this time, it is possible to control the amount of various polynuclear phenol compounds (h), which are formed as a byproduct, represented by the following general formula (4):

[Formula 13]

(4)

(wherein n is an integer of 0 or 4 or more) by determining the ratio of the amount of dicyclopentadiene to be used to the amount of phenol.

In the present invention, the percentage of the polynuclear phenol compounds (g) relative to the total of the polynuclear phenol compounds (g) and (h) is preferably 40 percent by weight or more, more preferably 50 percent by weight or more, most preferably 60 percent by weight or more. When the content of the polynuclear phenol compounds is less than 40 percent by weight, for example, when the amount of the phenol compound having 2 phenolic aromatic rings corresponding to the addition product in which n=0 in general formula (4) is too large, the curability of the photosensitive composition is reduced and sufficient photosensitivity cannot be obtained. On the other hand, when the amount of the polynuclear phenol compounds (h) corresponding to the addition product in which n is 4 or more in general formula (4) is too large, solubility of the photosensitive composition in other components is too low and unreacted phenolic hydroxyl groups remain after the completion of the photo-curing reaction, which causes impairment of water resistance of a film of the cured product and leads to insufficient film properties after curing. Occurrence of these problems is not preferable.

As commercially available products, for example, DPP-6125 among Nisseki Special Phenolic Resins DPP series (manufactured by Nippon Petrochemicals, Co., Ltd.) can suitably be used as the polynuclear phenol compounds (g).

As the polynuclear phenol compounds (b) used in the present invention, one of the above-described various polynuclear phenol compounds can be used singly or in combination of two or more thereof.

The energy beam-sensitive cationic polymerization initiators (c) used in the present invention refer to those compounds capable of generating substances which initiate cationic polymerization by energy-ray irradiation, preferably onium salts which generate Lewis acids by irradiation. Specifically, they include diazonium salts of Lewis acids, iodonium salts of Lewis acids, sulfonium salts of Lewis acids and the like, which are onium salts composed of aromatic diazoniums, aromatic iodoniums, aromatic sulfoniums, respectively, as the cation part thereof and $BF_4^-$, $PF_6^-$, $SbF_6^-$, $[BX_4]^-$ (wherein X is a phenyl group substituted with at least two or more fluorines or trifluoromethyl groups) or the like as the anion part. Specifically, they can include phenyldiazonium salts of boron tetrafluoride, diphenyliodonium salts of phosphorus hexafluoride, diphenyliodonium salts of antimony hexafluoride, tri-4-methylphenylsulfonium salts of arsenic hexafluoride, tri-4-methylphenylsulfonium salts of antimony tetrafluoride, diphenyliodonium salts of tetrakis(pentafluorophenyl)boron, mixtures of acetylacetone aluminum salts and ortho-nitrobenzylsilylether, phenylthiopyridium salts, phosphorus hexafluoride allene-iron complexes and the like, and the following products can be used: CD-1012 (trade name: manufactured by SARTOMER Company, Inc.), PCI-019, PCI-021 (trade name: manufactured by Nippon Kayaku Co., Ltd.), Optomer SP-150, Optomer SP-170 (trade name: Asahi Denka Co., Ltd.), UVI-6990 (trade name: manufactured by The Dow Chemical Company), CPI-100P, CPI-100A (trade name: manufactured by San-Apro Ltd.), TEPBI-S (trade name: manufactured by Nippon Shokubai Co., Ltd.), R HODORSIL PHOTOINITIATOR 2074 (trade name: manufactured by Rhodia Inc.) and the like. These products can be used singly or in combination of two or more thereof.

According to the present invention, photo-sensitivity which provides better curability and cured products having better adhesion and water resistance can be obtained by further using hydroxyl group-containing compounds (d). Such hydroxy group-containing compounds (d) are those compounds having one or more hydroxyl groups and one or more of at least one of a vinyl ether group and an oxetanyl group having cationic polymerizability in a molecule, and it is important that they have both a hydroxyl group and the above-described cationic polymerizable group in a molecule. This indicates that the photo-crosslinking mechanism of the photosensitive compositions according to the present invention is different from the mechanism of generally used conventional systems which use various polyfunctional vinyl ethers and oxetane compounds in combination which do not contain hydroxyl groups and have a plurality of polymerizable functional groups. That is, similar to the above-described polynuclear phenol compounds, it is important here that hydroxyl groups get directly involved in photo-curing reaction. Thus, since the reaction proceeds concertedly with the photo-cationic polymerization by vinyl ether groups or oxetanyl groups, it is considered that further use of these compounds in the above-described polynuclear phenol compounds in combination has allowed development of excellent curability which has been difficult to achieve. Conventional monofunctional vinyl ethers and oxetanes having only one polymerizable functional group in a molecule have significantly lower curability than polyfunctional vinyl ethers and oxetanes, which has been a problem. However, in the hydroxyl group-containing compounds according to the present invention, even monofunctional compounds can provide photosensitive compositions having sufficiently high curability.

The vinyl ether compounds having a hydroxyl group to be used herein may include hydroxyethyl vinyl ether, hydroxybutyl vinyl ether, cyclohexanedimethanol monovinyl ether, cyclohexanediol monovinyl ether, 9-hydroxynonyl vinyl ether, propylene glycol monovinyl ether, neopentyl glycol monovinyl ether, glycerol divinyl ether, glycerol monovinyl ether, trimethylolpropane divinyl ether, trimethylolpropane monovinyl ether, pentaerythritol monovinyl ether, pentaerythritol divinyl ether, pentaerythritol trivinyl ether, diethylene glycol monovinyl ether, triethylene glycol monovinyl ether, tetraethylene glycol monovinyl ether, tricyclodecanediol monovinyl ether, tricyclodecanedimethanol monovinyl ether and the like.

Moreover, the oxetane compounds having a hydroxy group for use in the present invention may include compounds represented by the following general formula (14):

(14)

(wherein R4 is a $C_1$-$C_6$ alkyl group such as a hydrogen atom, a methyl group, an ethyl group, a propyl group or a butyl group; a $C_1$-$C_6$ fluoroalkyl group, an allyl group, an aryl group, a furyl group or a thienyl group. R5 denotes a $C_1$-$C_6$ alkylene group such as methylene, ethylene, propylene or butylene and an oxyalkylene group such as oxyethylene, oxypropylene or oxybutylene, in which ether is bound to the alkylene group.)

Among them, a lower alkyl group, particularly an ethyl group, is preferred as R4, and a methylene group is preferred as R5.

These hydroxyl group-containing compounds may be used singly or in combination of two or more.

In the photosensitive composition of the present invention, other polymerization initiators which generate a material to initiate cationic polymerization by heating can also be used in combination with the polymerization initiator (c) of the present invention. Specific examples of the other initiators include 4,4'-bis(diethylamino)benzophenone, 2,4-diethylthioxanthone, isopropylthioxanthone, 9,10-diethoxyanthracene, 9,10-dibutoxyanthracene and the like.

In the photosensitive composition of the present invention, polyfunctional vinyl ethers or oxetanes which do not contain any hydroxyl group can also be used in combination with the hydroxyl group-containing compounds (d) of the present invention. These vinyl ethers can include, for example, ethylene glycol divinyl ether, butanediol divinyl ether, cyclohexanedimethanol divinyl ether, cyclohexanediol divinyl ether, trimethylolpropane trivinyl ether, pentaerythritol tetravinyl ether, glycerol trivinyl ether, triethylene glycol divinyl ether, diethylene glycol divinyl ether and the like. In addition, these oxetanes can include 1,4-bis([(3-ethyloxetane-3-yl)methoxy]methyl)benzene, bis[1-ethyl(3-oxetanyl)]methyl ether, 1,3-bis[(3-ethyloxetane-3-yl)methoxy]benzene, 4,4'-bis[(3-ethyloxetane-3-yl)methoxy]biphenyl, phenol novolac oxetane, oxetanyl silsesquioxane and the like.

In addition to the above compounds, it is possible to add other compounds having cationic polymerizability to the extent they do not adversely affect curability and film properties at the time of curing. These compounds include, for example, low-molecular weight epoxy compounds other than the above, which can be used as a diluent, cyclic lactone compounds, cyclic acetal compounds, cyclic thioether compounds, spiroorthoester compounds and the like. Furthermore, diols such as ethylene glycol, propylene glycol, polyethylene glycols such as diethylene glycol and triethylene glycol and polypropylene glycols; and polyhydric alcohols such as glycerin, trimethylolpropane and pentaerythritol, all of which have conventionally been used, can also be employed in the composition.

Free-radically polymerizable compounds such as (meth) acrylate monomers and oligomers and vinyl(meth)acrylate, photo-radical initiators and the like may optionally be added to the photosensitive composition of the present invention for the purpose of promoting curability (improving sensitivity) to energy beams. In particular, vinyl acrylate compounds, which have both a vinyl group and an acylate group in a molecule, are an effective diluent for using ink jet applications in that it is possible to reduce viscosity while maintaining high sensitivity since they have a low viscosity and are also cationically polymerizable. It is also possible to add antifoaming agents, leveling agents, polymerization inhibitors, waxes, antioxidants, nonreactive polymers, particulate inorganic fillers, silane coupling agents, photostabilizers, ultraviolet absorbers, antistatic agents, slipping agents and the like.

Among them, addition of particulate inorganic fillers and silane coupling agents is effective particularly to reduce moisture permeability. These particulate inorganic fillers include inorganic fillers having an average diameter of primary particles of 0.005-10 μm, and specifically include silica, alumina, talc, calcium carbonate, mica and the like. Both surface-treated and untreated particulate inorganic fillers can be used. Surface-treated particulate inorganic fillers include, for example, those methoxylated, trimethylsilylated, octylsilylated or surface-treated with silicone oils. These can be used singly or in combination of two or more thereof. The silane coupling agents include alkoxysilane compounds having a reactive group such as an epoxy group, a carboxyl group or a methacryloyl group, and specifically include γ-glycidoxypropyltrimethoxysilane, trimethoxysilylbenzoic acid, γ-methacryloxypropyltrimethoxysilane, vinyltrimethoxysilane, vinyltriacetoxysilane, β-(3,4-epoxycyclohexyl)ethyltrimethoxysilane and the like. These can be used singly or in combination of two or more thereof.

The percentage of each component in the photosensitive composition used in the present invention will now be described below. Incidentally, the term of "parts" as described below always refers to "parts by weight".

In the photosensitive composition, the sum of the phenolic hydroxyl group concentration of the polynuclear phenol compound (b) (defined as the number of moles of the polynuclear phenol compound (b)×the number of hydroxyl groups in a molecule) and the hydroxyl group concentration of the hydroxyl group-containing compound (d) (defined as the number of moles of the hydroxyl group-containing compound (d)×the number of hydroxyl groups in a molecule) is preferably at the same level as the epoxy group concentration of the epoxy compound (a) (defined as the number of moles of the epoxy compound (a)×the number of epoxy groups in a molecule) or less, more preferably 0.8 or less to the functional group concentration of the epoxy group of 1. This is because, when the phenolic hydroxyl group concentration or the hydroxyl group concentration is higher than the epoxy group concentration in the photosensitive composition, hydrophilicity of the films after curing will become excessively high to cause reduction in water resistance or a weakening of the cured films, leading to the cured films having insufficient properties. Although actual composition percentage depends on the molecular weight of each compound, it is generally from 30 to 90 percent by weight, preferably from 60 to 90 percent by weight, for the compound (a) having at least two or more epoxy groups in a molecule. The percentage of the polynuclear phenol compound (b) is from 0.1 to 40 percent by weight, preferably from 0.5 to 20 percent by weight. The percentage of the hydroxyl group-containing compound (d) is from 1 to 60 percent by weight, preferably from 10 to 40 percent by weight. In the case that the polynuclear phenol compound (b) is used in combination with the hydroxyl group-containing compound (d), the composition percentage is not particularly limited, but it is preferable to use 50-99 of the hydroxyl group-containing compound to 1-50 of the polynuclear phenol compound when the sum of the both is 100, since the polynuclear phenol compound has significant effect even when very small amount thereof is added.

The content of the energy beam-sensitive cationic polymerization initiator (c) in the photosensitive composition of the present invention is preferably from 0.1 to 10 percent by weight, more preferably from 0.2 to 5 percent by weight. The content of higher than 10 percent by weight is economically undesirable in that the expensive initiator is excessively used, and it is also not preferred in that light transmittance is reduced, leading to lack of curing at the bottom of the film. When the content is lower than 0.1 percent by weight, the amount of active cationic substances generated by the irradiation of energy beams is insufficient and sufficient curability cannot be obtained.

The content of the above described particulate inorganic fillers, which are optionally used, is from 0 to 70 percent by weight, preferably from 0.1 to 60 percent by weight in the cationic polymerizable photosensitive composition of the present invention. The content of silane coupling agents is from 0 to 10 percent by weight, preferably from 0.1 to 10 percent by weight in the cationic polymerizable photosensitive composition of the present invention.

The photosensitive composition of the present invention is useful as a photosensitive adhesive since it has excellent curability and excellent adhesion to various substrates. In particular, it is excellent in productivity since it has high polymerization conversion by the irradiation of energy beams, and it is also excellent in moisture resistance. Therefore, it is suitable as a sealant for FPDs such as liquid crystal displays which request not only good adhesion but also high reliability, organic EL (OLED) displays and electronic paper. Among others, OLED displays are the most preferred application for the sealers associated with the present invention, since high resistance to water vapor permeability is needed for the sealers.

Examples of the application of the photosensitive composition of the present invention as a sealer for OLED displays will be described below with reference to FIGS. 1 and 2.

Figure 1:
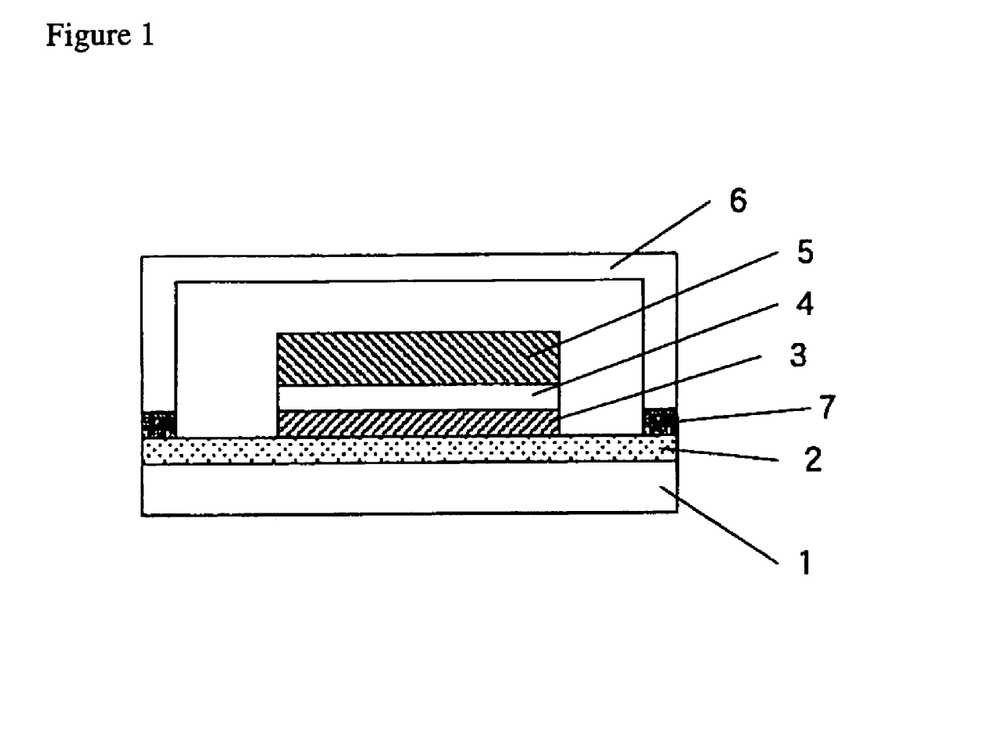
FIG. 1 is a schematic sectional view of a typical OLED element portion.

FIG. 1 is a sectional view of a typical OLED element portion. In FIG. 1, on a substrate 1 is formed a hole injection electrode 2, on which are formed a hole transport layer 3 and a light-emitting layer 4, on which is formed an electron injection electrode 5. In addition, a sealing member 6 to protect this element from the outside is formed around a laminate composed of the hole transport layer 3, the emitting layer 4 and the injection electrode 5, and is bonded to the hole injection electrode 2 with an adhesive layer 7 using a sealer composed of the cationic polymerizable photosensitive composition of the present invention.

Transparent or translucent glass, or resins such as polycarbonate, polyethylene terephthalate, cycloolefin-based polymers, or the like, can be used as the substrate 1. Flexible substrates composed of the thin films of these materials may also be used.

The hole injection electrode 2 is formed of a transparent conductive substance, and ITO, ATO (Sb-doped $SnO_2$), AZO (Al-doped ZnO) and the like can be used.

Materials for the hole transport layer 3 preferably include an organic material having a high hole mobility and good transparency and film formability, which includes triphenylamine derivatives such as TPD (N,N'-diphenyl-N,N'-bis(3-methylphenyl)-1,1'-diphenyl-4,4'-diamine), porphine, tetraphenylporphine copper, phthalocyanine, copper phthalocyanine, porphyrin compounds, aromatic tertiary amines such as N,N,N',N'-tetrakis(p-tolyl)-p-phenylenediamine, N,N,N',N'-tetraphenyl-4,4'-diaminobiphenyl and N-phenylcarbazole, stilbene compounds, triazole derivatives, oxadiazole derivatives, imidazole derivatives, polyarylalkane derivatives, pyrazoline derivatives, pyrazolone derivatives, phenylenediamine derivatives, amino-substituted chalcone derivatives, oxazole derivatives, styrylanthracene derivatives, fluorenone derivatives, hydrazone derivatives, silazane derivatives, polysilane-aniline-based derivatives and poly-3-methylthiophene and the like.

Materials for the light-emitting layer 4 preferably include a phosphor having fluorescent characteristics in the visible region and a good film formability, which includes 8-hydroxyquinoline aluminum ($Alq_3$), Be-benzoquinolinol ($BeBq_2$), benzoxazoles such as 2,5-bis(5,7-di-t-pentyl-2-benzoxazolyl)-1,3,4-thiadiazole, 4,4-bis [5,7-di(2-methyl-2-butyl)-2-benzoxazolyl]stilbene, 2,5-bis([5-α,α'-dimethylbenzyl]-2-benzoxazolyl)thiophene, 2,5-bis(5-methyl-2-benzoxazolyl) thiophene and 2-[2-(4-chlorophenyl)vinyl]naphtho[1,2-d] oxazole, benzothiazoles such as 2,2-(p-phenylenedivinylene)-bisbenzothiazole, benzimidazoles such as 2-[2-[4-(2-benzimidazolyl)phenyl]vinyl]benzimidazole, 2-[2-(4-carboxyphenyl)vinyl]benzimidazole, 8-hydroxyquinoline-based metal complexes such as tris(8-quinolinol)aluminum, 8-quinolinol lithium, tris(8-quinolinol) indium and bis(5-chloro-8-quinolinol)calcium, metal chelated oxynoid compounds such as dilithium epindolidione, styrylbenzene-based compounds such as 1,4-bis(2-methylstyryl)benzene, 1,4-(3-methylstyryl)benzene, 1,4-bis(3-ethylstyryl)]benzene and 1,4-bis(2-methylstyryl)-2-methylbenzene, distyrylpirazine derivatives such as 2,5-bis (4-methylstyryl)pyrazine, 2,5-bis(4-ethylstyryl)pyrazine and 2,5-bis[2-(4-biphenyl)vinyl]pyrazine, naphthalimide derivatives, perylene derivatives, oxadiazole derivatives, aldazine derivatives, cyclopentadiene derivatives, styrylamine derivatives, coumarin derivatives and the like. Anthracene, salicylates, pyrene, coronene and the like can also be used.

Materials for the electron injection electrode 5 include metals such as Al, In, Mg and Ti, Mg alloys such as Mg—Ag and Mg—In, Al alloys such as Al—Li, Al—Sr and Al—Ba and the like. Among others, alloys such as Al—Mg or Al—Li—Mg are particularly preferred in that they have a low work function and good corrosion resistance.

Materials for the sealing member 6 generally include stainless steel, glass and the like which are excellent in water vapor barrier properties. The sealing member 6 is bonded to the opposed hole injection electrode which is formed on the substrate using the sealer comprising the cationic polymerizable photosensitive composition of the present invention.

Figure 2:
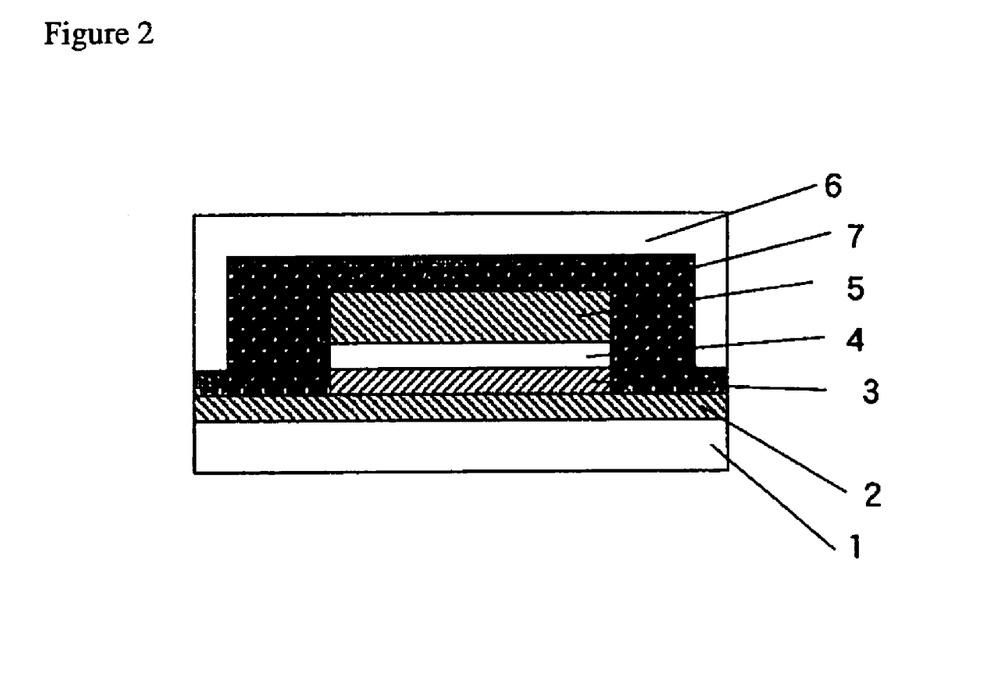
FIG. 2 is a schematic sectional view of an OLED element portion having a particular sealing structure.

FIG. 2 is a sectional view of an OLED element portion composed of another sealing structure. This structure is formed by a method comprising successively forming a hole injection electrode 2, a hole transport layer 3, a light-emitting layer 4 and an electron injection electrode 5 on a substrate 1, then forming an adhesive layer 7 using the sealer composed of the cationic polymerizable photosensitive composition of the present invention, and finally bonding a sealing member 6 to the adhesive layer 7. Such full sealing by a solid film is a method particularly useful for using a flexible material as the sealing member 6.

It is possible to form a multilayer structure in which the hole injection electrode 2, the hole transport layer 3, the light-emitting layer 4 and the electron injection electrode 5 are successively laminated on the substrate 1 by using known methods such as resistance heating vapor deposition, ion beam sputtering, ink-jetting and printing which enables forming under atmospheric pressure. The method for applying the sealer of the present invention on the multilayer structure is not particularly limited as long as it is a method in which the sealer can be applied uniformly, and includes, for example, printing such as screen printing and flexography, application using dispensers and the like.

After the sealing member 6 is bonded to the adhesive layer 7 formed by the sealer of the present invention, the curing thereof is performed by irradiating it with light as energy beams from either the sealing member 6 side or the substrate 1 side. The light source which can be used here is not particularly limited as long as it allows curing within a predetermined working time, and generally includes those which can irradiate the light of wavelengths corresponding to ultraviolet and visible light, for example, low-pressure mercury lamps, high-pressure mercury lamps, super high-pressure mercury lamps, xenon lamps, metal halide lamps, electrodeless discharge lamps and the like. Thus, the present invention provides a FPD, particularly an OLED display, produced by using the adhesive composed of the photosensitive composition as a sealer as described above.

Moreover, the photosensitive composition of the present invention, thin films of which can be cured at high speed in the air, can suitably be used as a coating material for a resin film, substrate or the like which is required to be cured at high speed without heating. Examples of the above include a coating material for forming an antireflective film used in FPD and the like, which is obtained by adding porous particulates having voids to the photosensitive composition of the present invention in order to form a film having a refractive index of 1.4 or less when the composition is applied on the substrate and cured.

These porous particulates include silica particles having an average particle size of from 5 nm to 1 μm, preferably from 5 to 100 nm. Specifically, they can include Aerosil (manufactured by Japan Aerosil Co., Ltd.) which is a fumed silica which is hydrophilic or surface treated to impart hydrophobicity thereto, Snowtex PS (manufactured by Nissan Chemical Industries, Ltd.) which is a pearl necklace-form silica sol in which silica particles are connected in a straight chain form and the like.

These porous particulates in the range of from 10 to 70 parts by weight are added to 100 parts by weight of the photosensitive composition, and they are preferably dispersed uniformly in the composition using a homogenizer or the like. The coating material composition may optionally be combined with the above described silane coupling agents which are alkoxysilanes to which an organic group is bonded or tetraalkoxysilanes such as tetraethoxysilane.

The coating agent thus obtained is applied on a transparent substrate, for example, a resin substrate composed of polymethylmethacrylate, polycarbonate, polystyrene, triacetyl-cellulose or the like or an inorganic material such as glass to form an antireflective film having a thickness in the range of from 10 nm to 1 μm. Since it is necessary to form a relatively thin film with a high degree of accuracy, micro-gravure coating, roll coating, spin coating, die coating, cast transfer, spray coating or the like is particularly used for applying the film on a substrate.

The big feature of the composition of the present invention is the ability to cure the thin coating film at a high speed by irradiating it with the above described active light, but the irradiation may optionally be combined with heating to cure the composition. The composition of the present invention essentially contains no solvent, but the composition may contain a solvent when it is diluted for the purpose of adjusting viscosity thereof or when porous particulates are used in the form of a sol. In these cases, the composition may generally be heated at 50 to 150° C. for several minutes before irradiation thereof with light to vaporize the solvent component in advance. Further, it is also possible to promote curing by subjecting the exposed composition to heating in the same manner.

Moreover, it is possible to obtain a photosensitive ink jet ink by adding a coloring agent to the composition of the present invention. The photosensitive composition of the present invention is also characterized in that it is relatively easy to reduce the viscosity thereof, and this characteristic, together with excellent photo-curability, allows the composition to be suitably used as a photosensitive ink jet ink by mixing an appropriate coloring agent in the composition.

Coloring agents which can be used in the present invention include various organic pigments and/or inorganic pigments, and specifically include white pigments such as titanium oxide, zinc white, white lead, lithopone and antimony oxide; black pigments such as aniline black, iron black and carbon black; yellow pigments such as chrome yellow, yellow oxide, hansa yellow (100, 50, 30, and the like), titan yellow, benzine yellow and permanent yellow; orange pigments such as chrome vermilion, permanent orange, vulcan first orange and indanthrene brilliant orange; brown pigments such as iron oxide, permanent brown and para-brown; red pigments such as red oxide, cadmium red, antimony vermilion, permanent red, rhodamine lake, alizarin lake, thioindigo red, PV carmine, monolight first red and quinacridone-based red pigments; violet pigments such as cobalt violet, manganese violet, first violet, methyl violet lake, indanthrene brilliant violet and dioxazine violet; blue pigments such as ultramarine blue, iron blue, cobalt blue, alkali blue lake, nonmetal phthalocyanine blue, copper phthalocyanine blue, indanthrene blue and indigo; green pigments such as chrome green, chrome oxide, emerald green, naphthol green, green gold, acid green lake, malachite green lake, phthalocyanine green and polychlorobromo copper phthalocyanine; and various fluorescent pigments, metallic powder pigments, extender pigment and the like. The content of these pigments in the composition of the present invention is from 1 to 50 percent by weight, preferably from 5 to 25 percent by weight.

Pigment dispersants may optionally be used for the above described pigments, and the pigment dispersants which can be used in the present invention include, for example, active agents such as higher fatty acid salts, alkyl sulfates, alkyl ester sulfates, alkylsulfonates, sulfosuccinates, naphthalene sulfonates, alkylphosphates, polyoxyalkylene alkyl ether phosphates, polyoxyalkylene alkyl phenyl ether, glycerol ester, sorbitan ester and polyoxyethylene fatty acid amides; as well as block copolymers and random copolymers comprising two or more monomers selected from the group consisting of styrene, styrene derivatives, vinylnaphthalene derivatives, acrylic acid, acrylic acid derivatives, maleic acid, maleic acid derivatives, itaconic acid, itaconic acid derivatives, fumaric acid and fumaric acid derivatives, and salts thereof.

As a method for dispersing pigments, various dispersing machines can be used, which include, for example, ball mills, sand mills, attritors, roll mills, agitators, Henschel mixers, colloid mills, ultrasonic homogenizers, pearl mills, wet jet mills and paint shakers. In addition, centrifuges and filters may be used to remove coarse particles in pigment dispersions.

The average particle size of the pigment particles in the pigmented ink is selected in consideration of stability, image density, feeling of gloss, light resistance and the like in the ink. It is preferred that the particle size be appropriately selected in view of the improvement of gloss and texture.

As described above, the photosensitive composition of the present invention can be suitably used in the above described various applications by taking advantage of the characteristics thereof.

EXAMPLES

The present invention will be described with reference to Examples. In Examples and Comparative Examples, the term of "parts" refers to "parts by weight" and "percent" refers to "percent by weight".

Photo-curability of the photosensitive compositions and physical properties of the cured films were evaluated in the manner as described below.

<Evaluation of Photo-curability and Physical Properties of Cured Films>

Tack-free exposure dose (TFED): The minimum exposure dose required for curing the surface and eliminating stickiness was determined by the observation by touching a film after exposure.

Water resistance: A film cured at the tack-free exposure dose was immersed in water at room temperature for 24 hours, and then the condition of the surface thereof was visually observed. When no surface roughness is observed, the water resistance of the film was determined to be "good".

Adhesion: A cured film formed on a prepared substrate was subjected to a cross cut tape peel (cross cut) test, and the residual ratio (when, in 100 squares, all of the 100 squares remained without peeling, the residual ratio is defined as 100/100) was determined.

Flexibility: A cured film formed on a surface-treated biaxially-oriented polypropylene (OPP) film was subjected to a 180 degree bending test, and the film in which a crack was observed was evaluated to be "unacceptable" and the film in which no change was observed was evaluated to be "acceptable".

Conversion: The conversion was determined by FT-IR by calculating the rate of reaction from the decrease of the respective absorptions of an epoxy group and a vinyl group before and after ultraviolet irradiation.

Example 1

A photosensitive composition was obtained by thoroughly mixing 100 parts of 3,4-epoxycyclohexylmethyl-3,4-epoxycyclohexanecarboxylate as the compound (a) having two or more alicyclic epoxy groups in a molecule, 6 parts of a p-tert-butyl-phenol novolac resin (PAPS series: manufactured by Asahi Organic Chemicals Industry Co., Ltd.) in which the content of a phenol compound having 3 to 5 phenolic aromatic rings is 50 percent by weight as the polynuclear phenol compound (b), and 2 parts of TEPBI-S (trade name: manufactured by Nippon Shokubai Co., Ltd.) of an iodonium salt type as the energy beam-sensitive cationic polymerization initiator (c). The composition was applied using a bar coater on substrates each composed of glass, aluminum, an OPP film and PET to form a film having a thickness of 4 μm. Then, each film was exposed by a 400 W high pressure mercury lamp exposure machine (manufactured by Sen Lights Corporation), and photo-curability of the coated film and physical properties of the cured film were evaluated. The results are shown in Table 1.

Example 2

A photosensitive composition was prepared by further using 14 parts of hydroxyethyl vinyl ether as the hydroxyl group-containing compound (d) in Example 1, and then photo-curability of the photosensitive composition and physical properties of the cured film thereof were evaluated. The results are shown in Table 1.

Example 3

A photosensitive composition was prepared by replacing 2 parts of TEPBI-S with 4 parts of UVI-6990 (about 50 percent solution of propylene carbonate: manufactured by The Dow Chemical Company) of a sulfonium salt type as the component (c) and replacing 14 parts of hydroxyethyl vinyl ether with 18 parts of 4-hydroxybutyl vinyl ether as the compound (d), in Example 2, and then photo-curability of the photosensitive composition and physical properties of the cured film thereof were evaluated. The results are shown in Table 1.

Example 4

A photosensitive composition was prepared by thoroughly mixing 70 parts of 3,4-epoxycyclohexylmethyl-3,4-epoxycyclohexanecarboxylate as the component (a), 4 parts of a PAPS-type p-tert-butyl-phenol novolac resin as the component (b), and 24 parts of hydroxybutyl vinyl ether as the component (d). Then, photo-curability of the photosensitive composition and physical properties of the cured film thereof were evaluated in the same manner as in Example 1. The results are shown in Table 1.

Example 5

A photosensitive composition was prepared by replacing 6 parts of a PAPS-type p-tert-butyl-phenol novolac resin as the component (b), in Example 3, with 9 parts of DPP-6125 (manufactured by Nippon Petrochemicals, Co., Ltd.) which is a dicyclopentadiene-phenol resin, and then photo-curability of the photosensitive composition and physical properties of the cured film thereof were evaluated. The results are shown in Table 1.

Example 6

A photosensitive composition was prepared by further using 6 parts of bis[1-ethyl(3-oxetanyl)]methyl ether (manufactured by Toagosei Co., Ltd.) in Example 3, and then photo-curability of the photosensitive composition and physical properties of the cured film thereof were evaluated. The results are shown in Table 1.

Example 7

A photosensitive composition was prepared by further using 9 parts of 1,4-butanediol divinyl ether in the photosensitive composition obtained in Example 3, and then photo-curability of the photosensitive composition and physical properties of the cured film thereof were evaluated. The results are shown in Table 1.

Example 8

A photosensitive composition was prepared by replacing 18 parts of 4-hydroxybutyl vinyl ether as the compound (d), in Example 3, with 15 parts of cyclohexanedimethanol monovinyl ether, and then photo-curability of the photosensitive composition and physical properties of the cured film thereof were evaluated. The results are shown in Table 1.

Example 9

A photosensitive composition was prepared by replacing 18 parts of 4-hydroxybutyl vinyl ether as the compound (d), in Example 3, with 18 parts of 3-ethyl-3-hydroxymethyloxetane, and then photo-curability of the photosensitive composition and physical properties of the cured film thereof were evaluated. The results are shown in Table 1.

Example 10

A photosensitive composition was prepared by replacing 18 parts of 4-hydroxybutyl vinyl ether as the compound (d), in Example 3, with 9 parts of 3-ethyl-3-hydroxymethyloxetane and 9 parts of 4-hydroxybutyl vinyl ether, and then photo-curability of the photosensitive composition and physical properties of the cured film thereof were evaluated. The results are shown in Table 1.

Example 11

A photosensitive composition was prepared by further using 10 parts of an epoxy resin EPICLON HP-7200 (trade name: manufactured by Dainippon Ink and Chemicals, Incorporated) as the compound (a) in Example 3, and then photo-curability of the photosensitive composition and physical properties of the cured film thereof were evaluated. The results are shown in Table 1.

Comparative Example 1

A photosensitive composition was prepared which comprises only 100 parts of 3,4-epoxycyclohexylmethyl-3,4-epoxycyclohexanecarboxylate as the component (a) and 4 parts of UVI-6990 as the component (c). Then, photo-curability of the photosensitive composition and physical properties of the cured film thereof were evaluated in the same manner as in Example 1. The results are shown in Table 1.

Comparative Example 2

A photosensitive composition was prepared without using the polynuclear phenol compound as the component (b) in Example 3, and then photo-curability of the photosensitive composition and physical properties of the cured film thereof were evaluated. The results are shown in Table 1.

Comparative Example 3

A photosensitive composition was prepared without using the polynuclear phenol compound as the component (b) in Example 9, and then photo-curability of the photosensitive composition and physical properties of the cured film thereof were evaluated. The results are shown in Table 1.

Comparative Example 4

A photosensitive composition was prepared without using the polynuclear phenol compound as the component (b) in Example 10, and then photo-curability of the photosensitive composition and physical properties of the cured film thereof were evaluated. The results are shown in Table 1. Comparative Example 5

A photosensitive composition was prepared by replacing 6 parts of the polynuclear phenol compound as the component (b) in Example 1 with 6 parts of pentaerythritol which is a polyhydric alcohol, and then photo-curability of the photosensitive composition and physical properties of the cured film thereof were evaluated. The results are shown in Table 1.

Comparative Example 6

A photosensitive composition was prepared by replacing 6 parts of the polynuclear phenol compound as the component (b) in Example 1 with 40 parts of butanediol divinyl ether which is a vinyl ether compound having no hydroxyl group, and then photo-curability of the photosensitive composition and physical properties of the cured film thereof were evaluated. The results are shown in Table 1.

Comparative Example 7

A photosensitive composition was prepared by replacing 6 parts of a PAPS-type p-tert-butyl-phenol novolac resin as the component (b) in Example 1 with 6 parts of CRG-951 (manufactured by Showa Highpolymer Co., Ltd.) which is a resole type phenol resin, and then photo-curability of the photosensitive composition and physical properties of the cured film thereof were evaluated. The results are shown in Table 1.

Comparative Example 8

A photosensitive composition was prepared by replacing 6 parts of a PAPS-type p-tert-butyl-phenol novolac resin as the component (b) in Example 3 with 6 parts of CRG-951 (manufactured by Showa Highpolymer Co., Ltd.) which is a resole type phenol resin, and then photo-curability of the photosensitive composition and physical properties of the cured film thereof were evaluated. The results are shown in Table 1.

Comparative Example 9

A photosensitive composition was prepared by replacing 6 parts of a PAPS-type p-tert-butyl-phenol novolac resin as the component (b) in Example 3 with 6 parts of tetrakis-[methylene-3-(3', 5'-di-tert-butyl-4'-hydroxyphenyl)propionate] methane (manufactured by Wako Pure Chemical Industries, Ltd.), and then photo-curability of the photosensitive composition and physical properties of the cured film thereof were evaluated. The results are shown in Table 1.

Comparative Example 10

A photosensitive composition was prepared by replacing 6 parts of a PAPS-type p-tert-butyl-phenol novolac resin as the component (b) in Example 3 with 6 parts of 2, 2'-methylenebis(4-t-butyl-phenol) which is a phenol compound having 2 phenolic aromatic rings, and then photo-curability of the photosensitive composition and physical properties of the cured film thereof were evaluated. The results are shown in Table 1.

Comparative Example 11

A photosensitive composition was prepared by replacing 6 parts of a PAPS-type p-tert-butyl-phenol novolac resin as the component (b) in Example 3 with 6 parts of a p-tert-butyl-phenol novolac resin in which the content of a polynuclear phenol compound having 6 or more phenolic aromatic rings is high and the content of a phenol compound having 3 to 5 phenolic aromatic rings is 25 percent, and then photo-curability of the photosensitive composition and physical properties of the cured film thereof were evaluated. The results are shown in Table 1.

Comparative Example 12

A photosensitive composition was prepared by replacing 6 parts of a p-tert-butyl-phenol novolac resin as the component (b) in Example 3 with 70 parts (corresponding to 56 percent by weight) of the p-tert-butyl-phenol novolac resin, and then photo-curability of the photosensitive composition and physical properties of the cured film thereof were evaluated. The results are shown in Table 1.

From the above results, it is understood that all of the photosensitive compositions as illustrated in Examples exhibit excellent photo-curability, water resistance and adhesion with various substrates by the irradiation of energy beams, and particularly the compositions (Examples 2 to 11) containing the hydroxyl group-containing compound (d) are excellent also in conversion and flexibility. Comparative Examples 1 to 4 correspond to the photosensitive compositions of Examples 1, 3, 9 and 10 from which the polynuclear phenol compound (b) is removed, respectively, and it is understood that these Comparative Examples exhibit higher TFED values, which means reduction of curability, and poorer adhesion. In Example 5, it was attempted to replace the polynuclear phenol compound (b) with a polyhydric alcohol, but desired performance was not obtained. When the polynuclear phenol of the present invention was replaced with a resole type phenol resin which is a thermosetting resin in Comparative Examples 7 and 8, physical properties of the cured films were not sufficient and tack on the surface thereof cured with time was reproduced. These are not preferable. In addition to the above, the polynuclear compound of the component (b) was replaced with different polynuclear phenol compounds, specifically, with a phenol-based antioxidant having a tert-butyl group at the ortho-position in Comparative Example 9, with only a phenol compound having 2 phenolic aromatic rings in Comparative Example 10, and with a p-tert-butyl-phenol novolac resin in which the content of a polynuclear phenol compound having 6 or more phenolic aromatic rings is high and the content of a phenol compound having 3 to 5 phenolic aromatic rings is less than 40 percent in Comparative Example 11. It is understood that satisfactory performance was not obtained in Comparative Examples 9 to 11. Furthermore, the polynuclear phenol of the present invention was used in an amount of 56 percent by weight in Comparative Example 12. It is understood that, even when the polynuclear phenol of the present invention is used, adhesion and water resistance are reduced when the amount exceeds 40 percent by weight.

The photosensitive compositions of the present invention will be described below for the cases where they are used as a photosensitive ink jet ink.

Example 12

A photosensitive composition was prepared by further using 9 parts of triethylene glycol divinyl ether in Example 4. In this composition, 5 parts of a titanium oxide pigment CR-50 (manufactured by Ishihara Sangyo Co., Ltd.) as a pigment, 1.5 parts of an aliphatic modified dispersant Solsperse 32000 (manufactured by Zeneca Co., Ltd.) as a pigment dispersant, 1 part of 2,4-diethylthioxanthone (manufactured by Nippon Kayaku Co., Ltd.) as a photosensitizer were dispersed using a sand mill for 4 hours, and the resulting composition was subjected to pressure filtration with a membrane filter to obtain an energy beam-curable ink jet ink. The resulting ink had a relatively low viscosity of 25 mPas as measured by E-type viscometer (at 25° C.). The ink was used for printing by an ink jet printer having a piezoelectric head on each substrate composed of glass, aluminum, an OPP film or PET. Then, the ink was cured by an ultraviolet irradiation device (with one metal halide lamp: output 120 W). Photo-curability of the ink and physical properties of the cured film thereof were evaluated. The results are shown in Table 2.

Example 13

In Example 12, 9 parts of triethylene glycol divinyl ether was replaced with 9 parts of 2-(2'-vinyloxyethoxy)ethyl acrylate and similar procedures as in Example 12 were carried out to obtain an energy beam-curable ink jet ink. The resulting ink had a viscosity of 25 mPas as measured by E-type viscometer (at 25° C.). The ink was used for printing by an ink jet printer having a piezoelectric head on each substrate composed of glass, aluminum, an OPP film or PET in the same manner as in Example 12. Then, the ink was cured by an ultraviolet irradiation device (the same as described in Example 12). Photo-curability of the ink and physical properties of the cured film thereof were evaluated. The results are shown in Table 2.

As shown in Examples 12 and 13, the photosensitive compositions of the present invention have a low viscosity and combine excellent photo-curability, water resistance, adhesion and flexibility, and so they can be suitably utilized in a photosensitive ink jet ink.

Then, examples for evaluating the properties of the photosensitive compositions of the present invention as sealers for OLED displays will be illustrated below.

Example 14

The photosensitive composition in Example 3 was applied using a bar coater, and then the film was subjected to light irradiation using a 400 W high pressure. mercury lamp exposure machine (manufactured by Sen Lights Corporation) under a condition of an exposure dose of 3000 mJ/cm$^2$ to obtain a cured film having a film thickness of 100 μm. The thus obtained film was measured for water vapor permeability under a condition of 40° C.×90% RH using a water vapor permeability tester: model L80-5000 (manufactured by LYSSY AG) according to JIS K7129. The water vapor permeability was measured to be 5 g/m$^2$·24 hr. In addition, the above photosensitive composition was laminated between a SUS stainless steel plate and a glass plate having a size of 30 mm×5 mm at a thickness of about 10 μm, and was subjected to light irradiation in the same manner as described above under a condition of an exposure dose of 500 mJ/cm$^2$ for adhesion of the laminate. Then, the laminate was measured for the adhesive strength at a rate of pulling of 5 mm/min using an RTC-1210A tensile tester (manufactured by A&D Co., Ltd.). It was found that the laminate had a good adhesive strength of 15 MPa.

Example 15

In Example 14, the photosensitive resin in Example 3 was replaced with the photosensitive composition in Example 5 to measure water vapor permeability and adhesive strength of the cured film, and they were measured to be 3 g/m$^2$·24 hr and 13 MPa, respectively.

Example 16

In Example 14, the photosensitive resin in Example 3 was replaced with the photosensitive composition in Example 8 to measure water vapor permeability and adhesive strength of the cured film, and they were measured to be 3 g/m$^2$·24 hr and 13 MPa, respectively.

Comparative Example 13

In Example 14, the photosensitive resin in Example 3 was replaced with the photosensitive composition in Comparative Example 2 to measure water vapor permeability and adhesive strength of a cured film, and they were measured to be 45 g/m$^2$·24 hr and 5 MPa, respectively.

It is apparent that the cationic polymerizable photosensitive compositions of the present invention as illustrated in Examples 14 to 16 combine low water vapor permeability with excellent photo-curability, water resistance, flexibility and high adhesion. On the other hand, it is understood that the composition illustrated in Comparative Example 13 which contains no polynuclear phenol (b) of the present invention has low adhesive strength and high water vapor permeability and is not suitable for using as a sealer. In the manufacture of an OLED display, the process for bonding a sealing member using a sealer is an important process to determine reliability of the OLED display to be manufactured. Therefore, the photosensitive compositions exhibiting excellent properties in the above Examples can be suitably utilized in sealers for FPDs, particularly for OLED displays requiring low water vapor permeability.

Lastly, an example in the case where the photosensitive composition of the present invention is used as a coating material for forming an antireflective film will be described below.

Example 17

A photosensitive composition for antireflective films was obtained by further adding 40 parts of R 812 (product name: manufactured by Japan Aerosil Co., Ltd.) which is a fumed silica whose surface is treated to impart hydrophobicity thereto and 100 parts of methyl ethyl ketone (Wako Pure Chemical Industries, Ltd.) as a solvent to 60 parts of the photosensitive composition in Example 4 and thoroughly mixing these components using a homogenizer. The resulting composition was coated on a substrate composed of Delaglas (trade name: manufactured by Asahi Kasei Chemicals Corporation) which is a PMMA resin containing a black pigment using a spin coater (manufactured by Mikasa Co., Ltd.) so as to provide a film having a thickness of 0.1 μm, followed by irradiating the film with ultraviolet rays. Then, the irradiated film was heated at 80° C. for one minute to remove a solvent, obtaining a sample for measuring reflectance. The sample was measured for an absolute specular reflection spectrum using an ultraviolet-visible spectrophotometer (V-550: manufactured by JASCO Corporation). As a result, the sample showed a very low reflectance of 0.8% at 620 nm.

TABLE 1

|  | Tack-free exposure dose | Water resistance | Adhesion | Flexibility | Conversion Epoxy | Vinyl |
|---|---|---|---|---|---|---|
| Example 1 | 30 mJ/cm$^2$ | good | 100/100 | unacceptable | 60% | — |
| Example 2 | <20 mJ/cm$^2$ | good | 100/100 | acceptable | 98% | 98% |
| Example 3 | 30 mJ/cm$^2$ | good | 100/100 | acceptable | 98% | 98% |
| Example 4 | 30 mJ/cm$^2$ | good | 100/100 | acceptable | 98% | 98% |
| Example 5 | 30 mJ/cm$^2$ | good | 100/100 | acceptable | 98% | 98% |
| Example 6 | <20 mJ/cm$^2$ | good | 100/100 | acceptable | 98% | 98% |
| Example 7 | <20 mJ/cm$^2$ | good | 100/100 | acceptable | 98% | 98% |
| Example 8 | 30 mJ/cm$^2$ | good | 100/100 | acceptable | 98% | 98% |
| Example 9 | 30 mJ/cm$^2$ | good | 100/100 | acceptable | 98% | 98% |
| Example 10 | 30 mJ/cm$^2$ | good | 100/100 | acceptable | 98% | 98% |
| Example 11 | 30 mJ/cm$^2$ | good | 100/100 | acceptable | 98% | 98% |
| Comparative Example 1 | 100 mJ/cm$^2$ | surface roughness/ whitening | 100/100 poor wettability (OPP) | unacceptable | 65% | — |

TABLE 1-continued

| | Tack-free exposure dose | Water resistance | Adhesion | Flexibility | Conversion Epoxy | Vinyl |
|---|---|---|---|---|---|---|
| Comparative Example 2 | 100 mJ/cm$^2$ | good | 100/100 poor wettability (OPP) | acceptable | 98% | — |
| Comparative Example 3 | 60 mJ/cm$^2$ | good | 0/100 poor wettability (OPP) | acceptable | 98% | — |
| Comparative Example 4 | 60 mJ/cm$^2$ | good | 0/100 poor wettability (OPP) | acceptable | 98% | — |
| Comparative Example 5 | 60 mJ/cm$^2$ | surface roughness/ whitening | 100/100 | acceptable | 85% | — |
| Comparative Example 6 | 100 mJ/cm$^2$ | surface roughness/ whitening | 0/100 poor wettability (OPP) | acceptable | 73% | 65% |
| Comparative Example 7 | 30 mJ/cm$^2$ | surface roughness/ whitening | 0/100 | unacceptable | 55% | — |
| Comparative Example 8 | 60 mJ/cm$^2$ * tack reproduced | partly surface roughness | — | acceptable | 88% | 85% |
| Comparative Example 9 | 60 mJ/cm$^2$ | partly surface roughness | 100/100 (glass, Al) 0/100 (PET, OPP) | acceptable | 80% | 80% |
| Comparative Example 10 | 80 mJ/cm$^2$ | partly surface roughness | 100/100 | acceptable | 85% | 83% |
| Comparative Example 11 | 60 mJ/cm$^2$ | partly surface roughness | 100/100 | acceptable | 90% | 93% |
| Comparative Example 12 | 60 mJ/cm$^2$ | partly surface roughness | 0/100 | unacceptable | 80% | 82% |

TABLE 2

| | Tack-free exposure dose | Water resistance | Adhesion | Flexibility | Conversion Epoxy | Vinyl |
|---|---|---|---|---|---|---|
| Example 12 | 30 mJ/cm$^2$ | good | 100/100 | acceptable | 95% | 93% |
| Example 13 | 20 mJ/cm$^2$ | good | 100/100 | acceptable | 95% | 92% |

INDUSTRIAL APPLICABILITY

The photosensitive composition of the present invention, which is excellent in curability in the air and whose cured product is excellent in adhesion to various substrates, water resistance and flexibility, can be suitably utilized in the fields of photosensitive coating materials, ink jet inks, adhesives, and particularly sealers for flat panel displays (FPD) such as organic EL.

The invention claimed is:

1. A photosensitive composition comprising:
   from 30 to 90 percent by weight of an epoxy compound (a) having two or more epoxy groups in a molecule;
   from 0.1 to 40 percent by weight of a polynuclear phenol compound (b) comprising three to five phenolic aromatic rings, wherein either of the positions ortho to each hydroxyl group is not substituted with any of a methylol group, or an alkyl group or cycloalkyl group having four or more carbon atoms and each of two or more of the phenolic aromatic rings has at least one unsubstituted position ortho to the hydroxyl group;
   from 0.1 to 10 percent by weight of an energy beam-sensitive cationic polymerization initiator (c); and
   from 1 to 60 percent by weight of a hydroxyl group-containing compound (d) having one or more hydroxyl groups and one or more of at least one of a vinyl ether group and an oxetanyl group having cationic polymerizability in a molecule.

2. The photosensitive composition according to claim 1, wherein the epoxy groups of the epoxy compound (a) are alicyclic epoxy groups.

3. A cured product obtained by irradiating the photosensitive composition according to claim 2 with an energy beam.

4. A photosensitive adhesive comprising the photosensitive composition according to claim 2.

5. The photosensitive composition according to claim 1, wherein the polynuclear phenol compound (b) comprises a plurality of polynuclear phenol compounds (e) represented by formula (1):

wherein R denotes a $C_1$-$C_5$ alkyl group, a $C_5$-$C_{10}$ cycloalkyl group, a $C_1$-$C_5$ alkoxy group, a halogen atom, a hydroxyl group, an aryl group or an aralkyl group; R may be the same or different; m is an integer from 0 to 3; and n is an integer from 1 to 3; and further contains a plurality of polynuclear phenol compounds (f) represented by formula (2):

(2)

wherein R denotes a $C_1$-$C_5$ alkyl group, a $C_5$-$C_{10}$ cycloalkyl group, a $C_1$-$C_5$ alkoxy group, a halogen atom, a hydroxyl group, an aryl group or an aralkyl group; R may be the same or different; m is an integer from 0 to 3; and n is an integer of 0 or 4 or more, the percentage of the plurality of polynuclear phenol compounds (e) relative to a total of the plurality of polynuclear phenol compounds (e) and the plurality of polynuclear phenol compounds (f) being 40 percent by weight or more.

6. The photosensitive composition according to claim 1, wherein the polynuclear phenol compound (b) comprises a plurality of polynuclear phenol compounds (g) represented by formula (3):

(3)

wherein n is an integer from 1 to 3; and
further contains a plurality of polynuclear phenol compounds (h) represented by formula (4):

(4)

wherein n is an integer of 0 or 4 or more,
the percentage of the plurality of polynuclear phenol compounds (g) relative to the total of the plurality of polynuclear phenol compounds (g) and the plurality of polynuclear phenol compounds (h) being 40 percent by weight or more.

7. A cured product obtained by irradiating the photosensitive composition according to claim 1 with an energy beam.

8. The cured product according to claim 7 further comprising heating the photosensitive composition to obtain the cured product.

9. A photosensitive adhesive comprising the photosensitive composition according to claim 1.

10. A cured product obtained by irradiating the photosensitive material according to claim 9 with an energy beam.

11. The cured product according to claim 10 further comprising heating the photosensitive material to obtain to cured product.

12. A flat panel display including the photosensitive adhesive according to claim 9 as a sealer.

13. The flat panel display according to claim 12, wherein the flat panel display is an organic electroluminescent display.

14. A photosensitive coating material comprising the photosensitive composition according to claim 1.

15. The photosensitive coating material according to claim 14, further comprising an alkoxysilane.

16. The photosensitive coating material according to 15, wherein the alkoxysilane is tetraethoxysilane.

17. A photosensitive ink jet ink comprising the photosensitive composition according to claim 1 and a coloring agent.

18. A photosensitive composition comprising:
from 30 to 90 percent by weight of an epoxy compound (a) having two or more epoxy groups in a molecule;
from 0.1 to 40 percent by weight of a polynuclear phenol compound (b) comprising three to five phenolic aromatic rings, wherein either of the ortho positions of each hydroxyl group is not substituted with any of a methylol group, or an alkyl group or cycloalkyl group having four or more carbon atoms and each of two or more of the phenolic aromatic rings has at least one unsubstituted position ortho to the hydroxyl group; and
from 0.1 to 10 percent by weight of an energy beam-sensitive cationic polymerization initiator (c), and
wherein the polynuclear phenol compound (b) comprises a plurality of polynuclear phenol compounds (g) represented by formula (3):

(3)

wherein n is an integer from 1 to 3; and
further contains a plurality of polynuclear phenol compounds (h) represented by formula (4):

(4)

wherein n is an integer of 0 or 4 or more
the percentage of the plurality of polynuclear phenol compounds (g) relative to the total of the plurality of polynuclear phenol compounds (g) and the plurality of polynuclear phenol compounds (h) being 40 percent by weight or more.

19. A photosensitive ink jet ink comprising a photosensitive composition and a coloring agent, the photosensitive composition comprising:
from 30 to 90 percent by weight of an epoxy compound (a) having two or more epoxy groups in a molecule;
from 0.1 to 40 percent by weight of a polynuclear phenol compound (b) comprising three to five phenolic aromatic rings, wherein either of the ortho positions of each hydroxyl group is not substituted with any of a methylol group, or an alkyl group or cycloalkyl group having four or more carbon atoms and each of two or more of the phenolic aromatic rings has at least one unsubstituted position ortho to the hydroxyl group; and
from 0.1 to 10 percent by weight of an energy beam-sensitive cationic polymerization initiator (c).

* * * * *